US012675102B2

(12) United States Patent
Carr et al.

(10) Patent No.: US 12,675,102 B2
(45) Date of Patent: Jul. 7, 2026

(54) PROCESS PLANT TRIP OR PERTURBATION PREVENTION

(71) Applicant: Schneider Electric USA, Inc., Boston, MA (US)

(72) Inventors: Lanyon Carr, Gold River, CA (US); Chennan Li, Newark, CA (US); Jon A. Bickel, Murfreesboro, TN (US); Mostafa Parham Khosh, Mesa, AZ (US); Mohamed Samir Abd-Elgaber Mostafa, Obour City (EG); Babar Iftikhar, Abu Dhabi (AE)

(73) Assignees: SCHNEIDER ELECTRIC USA, INC., Boston, MA (US); SCHNEIDER ELECTRIC SYSTEMS USA, INC., Foxborough, MA (US)

( * ) Notice: Subject to any disclaimer, the term of this patent is extended or adjusted under 35 U.S.C. 154(b) by 0 days.

(21) Appl. No.: 18/673,744

(22) Filed: May 24, 2024

(65) Prior Publication Data

US 2024/0393774 A1 Nov. 28, 2024

Related U.S. Application Data

(60) Provisional application No. 63/469,216, filed on May 26, 2023.

(51) Int. Cl.
*G05B 23/02* (2006.01)

(52) U.S. Cl.
CPC ..... *G05B 23/0221* (2013.01); *G05B 23/0275* (2013.01)

(58) Field of Classification Search
CPC ........... G05B 2219/37514; G05B 2219/37534; G05B 23/0221; G05B 23/0267; G05B 23/0275
See application file for complete search history.

(56) References Cited

U.S. PATENT DOCUMENTS

| | | | | |
|---|---|---|---|---|
| 2005/0049834 | A1* | 3/2005 | Bottomfield ....... | G05B 23/0229 702/183 |
| 2010/0023307 | A1* | 1/2010 | Lee .................... | G06F 18/2321 703/7 |
| 2012/0236471 | A1* | 9/2012 | Vinken .................... | G06F 1/26 361/622 |
| 2013/0060524 | A1 | 3/2013 | Liao | |

(Continued)

FOREIGN PATENT DOCUMENTS

CN 105389475 B 4/2018

OTHER PUBLICATIONS

JP 3166788—English Translation (Year: 2011).*
CN 113086798—English Translation (Year: 2021).*
Choi, Deep Learning for Anomaly Detection in Time-Series Data: review, Analysis, and Guidelines, IEEE Access vol. 9, Sep. 7, 2021, 23 pages (Year: 2021).*

(Continued)

*Primary Examiner* — Michael J Dalbo
(74) *Attorney, Agent, or Firm* — Stinson LLP

(57) ABSTRACT

Systems and methods for simultaneously analyzing time-series and dominant frequency data from both a process domain and an electrical domain of a facility, such as an industrial plant, to detect instances of deviation from optimal, normal, or other predefined process conditions or electrical trips. Detecting when changes in frequencies occur in the time-series data creates a time-series of the changes in dominant frequencies. A data analysis server detects instances of deviation from the predefined process conditions or electrical trips by detecting one or more of correlations, patterns, clusters, and the like in the rates of change. The data analysis server employs one or more of statistical analyses, data mining, machine learning, deep neural networks, parallel coordinate analyses, etc. to identify the deviations and predict or detect onset of an undesired event such as a process perturbation or electrical trip.

26 Claims, 8 Drawing Sheets

(56)                 References Cited

U.S. PATENT DOCUMENTS

| | | |
|---|---|---|
| 2015/0377057 A1 | 12/2015 | Desabhatla |
| 2018/0246506 A1* | 8/2018 | Neti .................... G01M 13/028 |
| 2019/0003928 A1* | 1/2019 | Unuma .............. H02P 29/0241 |
| 2020/0019155 A1 | 1/2020 | Cella et al. |
| 2022/0282897 A1* | 9/2022 | Gopalnarayanan ..... F25B 13/00 |
| 2023/0153389 A1 | 5/2023 | Bickel et al. |
| 2023/0162484 A1* | 5/2023 | Ryu .................... G06V 20/176 |
| | | 382/159 |
| 2023/0306154 A1* | 9/2023 | Khandelwal ............ G06F 30/20 |
| 2024/0203767 A1* | 6/2024 | Kode ............... H01L 21/67276 |

OTHER PUBLICATIONS

Hsieh, Unsupervised online anomaly detection on multivariate sensing time series data for smart manufacturing, in Proc. IEEE 12th Conf. Service-Oriented Comput. Appl. (SOCA), Nov. 2019, pp. 90-97 (Year: 2019).*

International Search Report and Written Opinion from PCT Application No. PCT/US2024/030808, dated Sep. 3, 2024, 18 pages.

Hsieh, Unsupervised online anomaly detection on multivariate sensing time series data for smart manufacturing, in Proc. IEEE 12th Conf. Service-Oriented Comput. Appl. (SOCA), Nov. 2019, pp. 90-97.

Choi, Deep Learning for Anomaly Detection in Time-Series Data: review, Analysis, and Guidelines, IEEE Access vol. 9, Sep. 7, 2021, 23 pages.

Extended European Search Report from EP Application No. 24177981. 8, dated Oct. 16, 2024, 11 pages.

* cited by examiner

| DateTime | 33TI511.PV | 33TZI518.PV | 33TZI510.PV | Frequency_1 | Frequency_2 | Anomaly_Score |
|---|---|---|---|---|---|---|
| 12:00:00 AM | 344.5 | 346.9 | 344.9 | 58 | 30 | 0 |
| 12:00:30 AM | 344.6 | 347 | 345 | 80 | 30 | 0.5 |
| 12:01:00 AM | 344.7 | 347 | 345 | 80 | 30 | 0.8 |
| 12:01:30 AM | 344.7 | 347.1 | 345 | 80 | 30 | 5 |
| 12:02:00 AM | 344.7 | 347 | 345 | 80 | 30 | 8 |
| 12:02:30 AM | 344.7 | 346.9 | 345.1 | 80 | 30 | 0.6 |
| 12:03:00 AM | 344.7 | 347.1 | 345 | 58 | 30 | 0.3 |
| 12:03:30 AM | 344.8 | 347.1 | 345.1 | 58 | 30 | 0.2 |
| 12:04:00 AM | 344.8 | 347.2 | 345.1 | 58 | 30 | 0.1 |

FIG. 7

PROCESS PLANT TRIP OR PERTURBATION PREVENTION

CROSS-REFERENCE TO RELATED APPLICATION

This application claims priority to U.S. Provisional Patent Application No. 63/469,216, filed May 26, 2023, the entire disclosure of which is incorporated herein by reference.

BACKGROUND

Process perturbations (or upsets), electrical trips, and other unplanned interruptions of plant operations are costly. In the event of a trip, for example, there is the potential for damage to equipment, injuries to personnel, lost product/material, business impact, additional maintenance costs, etc. The ability to quickly detect or predict the onset of a process perturbation or an electrical trip incident is necessary to allow an operator time to take corrective action for preventing the undesired incident.

SUMMARY

Aspects of the present disclosure permit detecting indicators of the onset of a process perturbation or an electrical trip event to eliminate, defer, or mitigate interruptions.

In an aspect, a method of detecting interruptions in operations of a facility, such as an industrial plant, includes receiving first time-series data from a process domain or system of the facility and receiving second time-series data from an electrical domain or system of the facility. The method further comprises performing a wavelet transformation on the first and second time-series data to obtain transformed data in the time-frequency domain, analyzing the transformed first and second time-series data to identify one or more dominant frequency changes over time in at least one of the first time-series data from the process domain or system and in the second time-series data from the electrical domain or system, and detecting one or more instances of deviation from predefined conditions in either the process domain or system, the electrical domain or system, or both based on the identified one or more dominant frequency changes over time. The detected deviation indicates an onset of a facility interruption. The method also includes generating at least one action configured to defer or mitigate the facility interruption in response to detecting the one or more instances of deviation from the predefined conditions.

In another aspect, a system for detecting interruptions in operations of a facility, such as an industrial plant, comprises one or more sensors associated with a process domain or system of the facility providing first time-series data and one or more sensors associated with an electrical domain or system of the facility providing second time-series data. The system also includes a data analysis processor receiving and responsive to the first and second time-series data and a memory coupled to the data analysis processor. The memory stores processor-executable instructions that, when executed, configure the data analysis processor for performing a wavelet transformation on the first and second time-series data to obtain transformed data, analyzing the transformed first and second time-series data to identify one or more frequency changes over time in at least one of the first time-series data from the process domain or system and in the second time-series data from the electrical domain or system, and detecting one or more instances of deviation from predefined conditions in either the process domain or system, the electrical domain or system, or both based on the identified one or more frequency changes over time. The detected deviation indicates an onset of a facility interruption. The processor-executable instructions further configure the data analysis processor for generating at least one action configured to defer or mitigate the facility interruption in response to detecting the one or more instances of deviation from the predefined conditions indicating the onset of the facility interruption.

Other objects and features of the present invention will be in part apparent and in part pointed out herein.

BRIEF DESCRIPTION OF THE DRAWINGS

FIGS. 5 to 8 illustrate a parallel coordinates approach for detecting anomalies.

Corresponding reference characters indicate corresponding parts throughout the drawings.

DETAILED DESCRIPTION

The features and other details of the concepts, systems, and techniques sought to be protected herein will now be more particularly described. It will be understood that any specific embodiments described herein are shown by way of illustration and not as limitations of the disclosure and the concepts described herein. Features of the subject matter described herein can be employed in various embodiments without departing from the scope of the concepts sought to be protected.

Process perturbations and trips in a facility, such as an industrial plant, can be costly and create the potential for equipment damage, injuries, excessive maintenance/repairs, loss of product/materials, business impact(s), and so forth. Aspects of the present disclosure permit simultaneously analyzing time-series data from both the process domain, or system, and the electrical domain, or system, (see FIG. 3) and their corresponding representations in the time-frequency domain to detect deviations from predefined process conditions indicative of potential perturbations to the process that could lead to electrical trips. It is to be understood that process domain and process system are used interchangeably herein. Similarly, it is to be understood that electrical domain and electrical system are used interchangeably herein.

Figure 1:
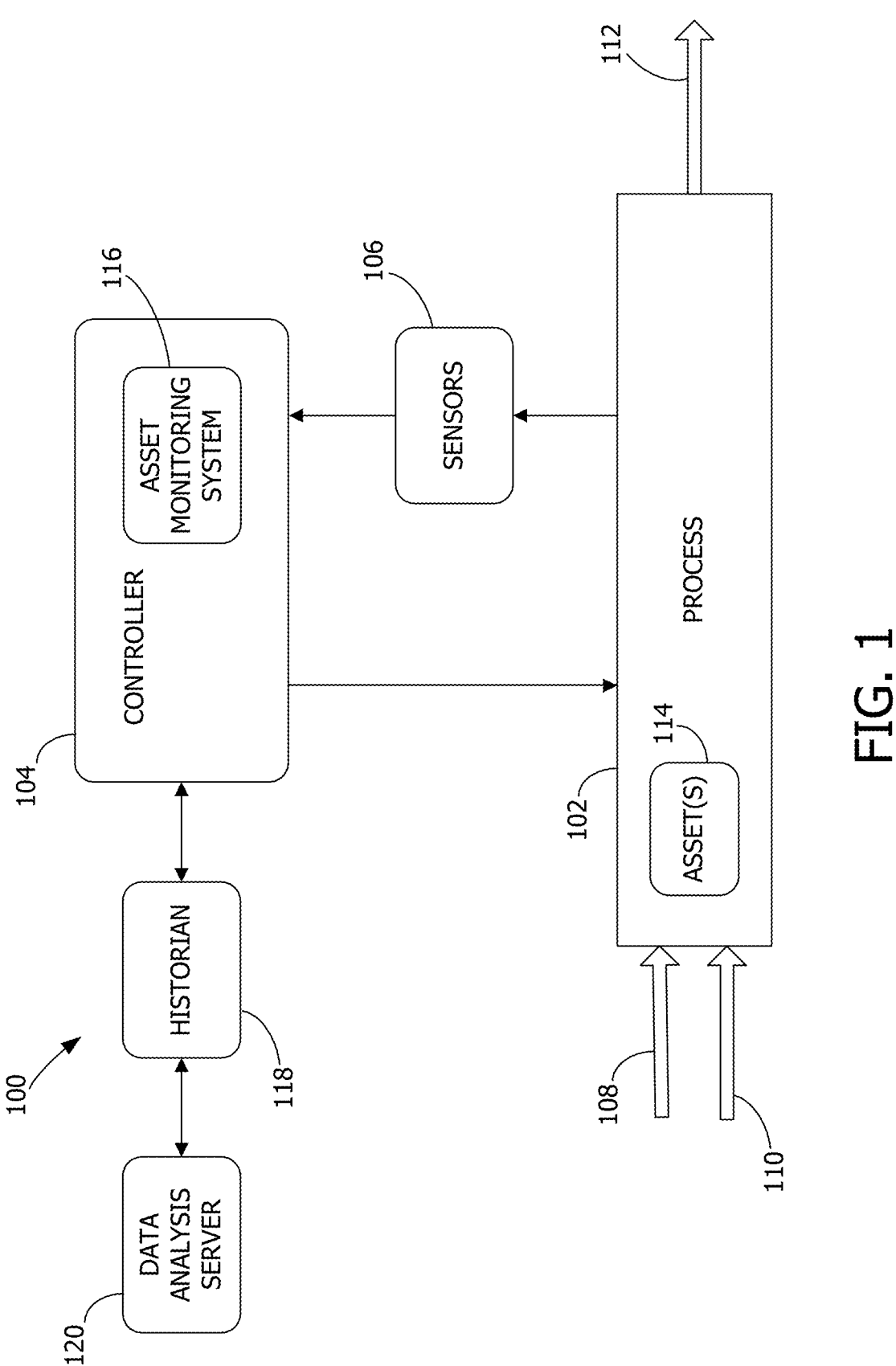
FIG. 1 is a block diagram illustrating a process control system according to an embodiment.

FIG. 1 displays the basic structure of an example process control system 100. In an embodiment, at least one process 102 is communicatively connected to a controller 104 and sensors 106. The process 102 has inputs 108 and 110 that comprise the necessary inputs for the process to create an output 112. In an embodiment, the input 108 includes energy for running process 102 and input 110 includes physical or chemical raw materials for use in process 102. The output 112 comprises physical or chemical products from the process 102 or energy production in the form of electricity or the like.

The sensors 106 may include IEDs (intelligent electronic devices). As used herein, an IED is a computational electronic device optimized to perform a particular function or set of functions. Examples of IEDs include smart utility meters, smart sensors, power quality meters, temperature transmitters, flow rate transmitters, pressure transmitters, online quality measurements, and other metering devices. IEDs may also be imbedded in variable speed drives (VSDs), uninterruptible power supplies (UPSs), circuit breakers, relays, transformers, or any other equipment or apparatus. IEDs may be used to perform monitoring and control functions in a wide variety of installations. The installations may include petroleum refineries, petrochemical facilities, gas processing facilities, liquefied natural gas facilities, utility systems, data centers, industrial facilities, warehouses, office buildings or other commercial complexes, campus facilities, computing co-location centers, data centers, power distribution networks, and the like. For example, where the IED is an electrical power monitoring device, it may be coupled to (or be installed in) an electrical power distribution system and configured to sense and store data as electrical parameters (e.g., voltages, currents, imbalances, waveform distortions, symmetrical components, energies and powers, etc.) representing operating characteristics (e.g., changes, magnitudes, slew rates, durations, etc.) of the power distribution system. These parameters and characteristics may be analyzed by a user to evaluate potential performance, reliability, or power quality-related issues. The IED may include at least a controller (which in certain IEDs can be configured to run one or more applications simultaneously, serially, or both), firmware, a memory, a communications interface, and connectors that connect the IED to external systems, devices, and/or components at any voltage level, configuration, and/or type (e.g., ac, dc). At least certain aspects of the monitoring and control functionality of a IED may be embodied in a computer program that is accessible by the IED.

In some embodiments, the term "IED" as used herein may refer to a hierarchy of IEDs operating in parallel and/or series. For example, a IED may correspond to a hierarchy of energy meters, power meters, and/or other types of resource meters. The hierarchy may comprise a tree-based hierarchy, such a binary tree, a tree having one or more child nodes descending from each parent node or nodes, or combinations thereof, wherein each node represents a specific IED. In some instances, the hierarchy of IEDs may share data or hardware resources and may execute shared software. It is understood that hierarchies may be non-spatial such as billing hierarchies where IEDs grouped together may be physically unrelated.

The controller 104 sends data to the at least one process 102 to direct the operations thereof according to the goals of controller 104. The data sent comprises commands that operate various types of process elements, equipment, or assets 114, of the process 102, such as pumps, motors, valves, actuators, electrostatic precipitators, electrolyzers, vibrators, heaters, or the like. The asset 114 may be any mechanical, chemical, electrical, biological, or combined mechanism or set of mechanisms that is used to convert energy and materials into value added products or production. The sensors 106 monitor process 102 at various points and gather data from those points. The sensors 106 then send the data gathered to controller 104. Based on the gathered data, controller 104 can send additional commands to process 102. In this way, the system 100 forms a control feedback loop, where controller 104 reacts to changes in process 102 as observed by sensors 106. Different actions carried out by process 102 according to the commands of controller 104 may change the data being gathered by sensors 106, thus causing further adjustments by controller 104 in response to those changes. By implementing this control feedback loop, the at least one process 102 can be controlled by the controller 104 in an efficient and effective manner.

To ensure safe operation, controller 104 includes one or more condition or asset monitoring systems 116 responsive to sensors 106 for collecting, process measurements such as temperatures, flow rates, pressures, chemical compositions, stream properties, vibration analysis, motor current signature analysis, ultrasonic analysis, thermal analysis, and the like on critical assets 114. In the illustrated embodiment, system 100 also includes a historian 118 configured to capture and store industrial data, including process(es), alarm(s), and event history data. According to aspects of the present disclosure, one or more servers, referred to as a data analysis server, or processor, 120, simultaneously analyzes time-series and frequency data from both the process domain and the electrical domain (see FIG. 3) to detect deviations and/or excursions from predefined process conditions indicative of possible electrical trips or perturbations to one or more processes. In an embodiment, the data analysis server 120 is a Windows or Linux server connected to the plant real-time historian 118 for the time-series process data and the electrical Supervisory Control and Data Acquisition (SCADA) system. Preferably, results of the analysis are displayed on a monitor connected to the server 120 and/or communicated other servers or systems such as the real time historian 118.

Figure 2:
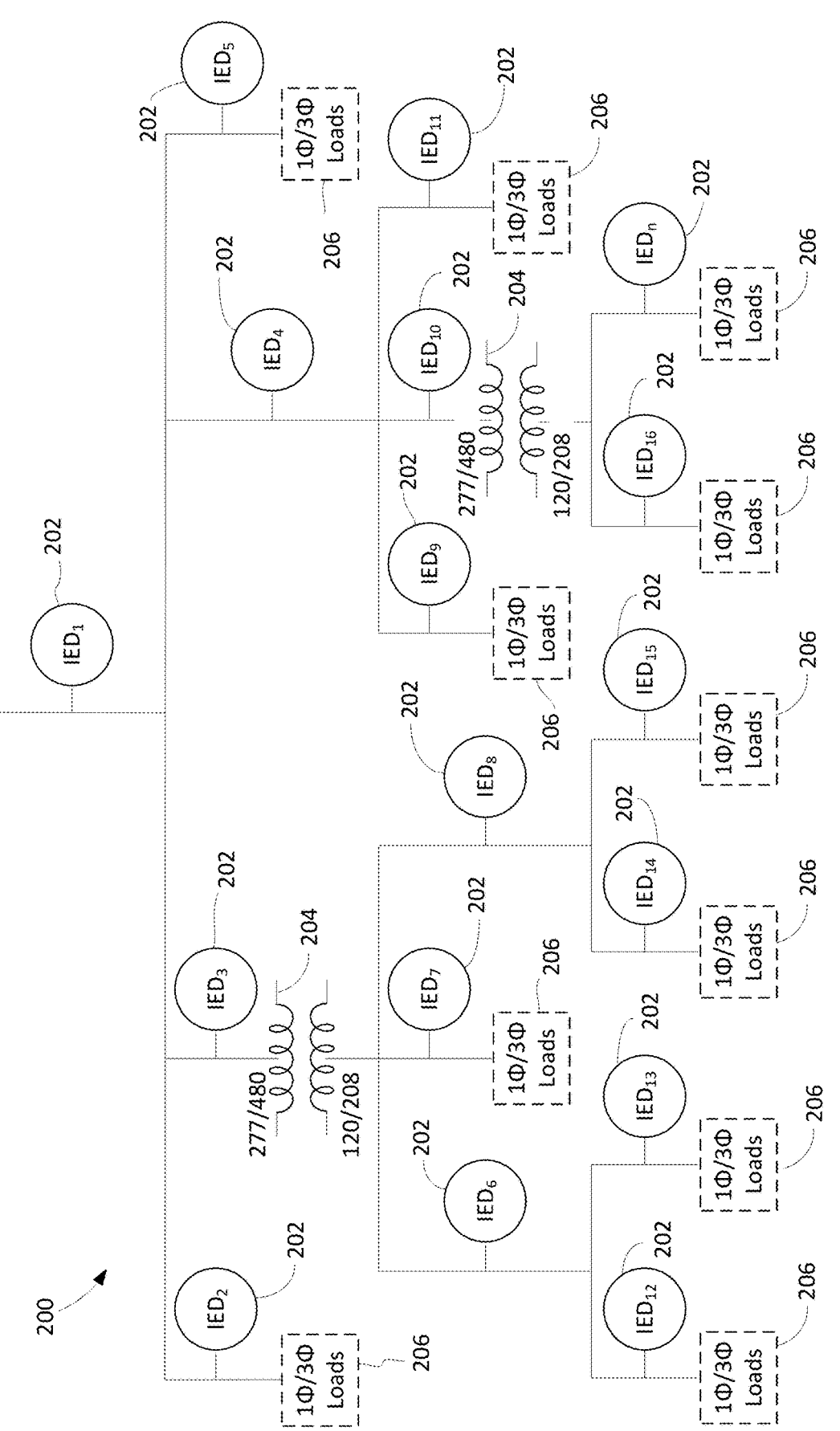
FIG. 2 illustrates an exemplary electrical system according to an embodiment.

Referring to FIG. 2, an example electrical system 200 in accordance with embodiments of the disclosure includes one or more intelligent electronic devices (IEDs) 202 capable of sampling, sensing, or monitoring one or more parameters (e.g., power monitoring parameters) associated with one or more loads 206 (also sometimes referred to herein as "equipment" or "apparatuses"). Although indicated with the same reference numeral, it is to be understood that the IEDs 202 may differ from each other (e.g., IEDs with different features and capabilities, etc.) and loads 206 may differ from each other (e.g., motors, thyristors, etc.) depending on the specific design and features of the electrical system 200. In embodiments, loads 206 and IEDs 202 may be installed on one or more processes and/or loads/equipment/apparatuses/etc. within, for example, a petroleum refinery or other processing facility.

As shown in FIG. 2, IEDs 202 are each coupled to one or more of the loads 206, which may be located "upline/upstream" or "downline/downstream" from the IEDs in some embodiments. The loads 206 include, for example, machinery or apparatuses associated with a particular application (e.g., an industrial application), applications, and/or process(es). The machinery may include electrical or electronic equipment, for example. The machinery may also include the controls and/or ancillary equipment associated with the equipment. In accordance with aspects of the present disclosure, loads 206 comprise a mix of single-phase and three-phase loads (e.g., motors).

In embodiments, IEDs 202 may monitor and, in some embodiments, analyze parameters (e.g., energy-related parameters) associated with loads 206 to which they are coupled. For instance, IED 202 (e.g., a metering device) captures energy-related waveforms in electrical system 200. As used herein, an IED is a computational electronic device optimized to perform a particular function or set of functions. Examples of IEDs 202 include smart utility meters, power quality meters, microprocessor relays, digital fault recorders, and other analog and/or digital metering devices. The IEDs 202 may also be embedded in variable speed drives (VSDs), uninterruptible power supplies (UPSs), circuit breakers, relays, transformers, or any other electrical apparatus. In addition, IEDs 202 may be used to perform measurement/monitoring and control functions in a wide variety of installations. The installations may include utility systems, industrial facilities (such as petroleum refineries), warehouses, office buildings or other commercial complexes, campus facilities, computing co-location centers, data centers, power distribution networks, or any other structure, process, equipment, or load that uses electrical energy. For example, where IED 202 is an electrical power monitoring device, it may be coupled to (or be installed in) an electrical power transmission or distribution system and configured to sense/measure and store data (e.g., waveform data, logged data, I/O data, etc.) as electrical parameters (e.g., voltages, currents, imbalances, waveform distortions, symmetrical components, energies and powers, etc.) representing operating characteristics (e.g., changes, magnitudes, slew rates, durations, etc.) of the electrical distribution system. These parameters and characteristics may be analyzed by a user to evaluate potential performance, reliability and/or power quality-related issues, for example. One or more of the IEDs 202 may include at least a controller (which in certain IEDs can be configured to run one or more applications simultaneously, serially, or both), firmware, a memory, a communications interface, and connectors that connect the IED to external systems, devices, and/or components at any voltage level, configuration, and/or type (e.g., ac, dc, single-phase, three-phase, etc.). At least certain aspects of the monitoring and control functionality of IED 202 may be embodied in a computer program that is accessible by the IED.

According to another aspect, IEDs 202 may detect overvoltage and undervoltage conditions (e.g., transient overvoltages), as well as other parameters such as flow rates, pressures, and temperature (including ambient temperature). According to a further aspect, IEDs 202 may provide indications of monitored parameters and detected conditions that can be used to control loads 206 and other equipment in the electrical system 200 in which loads 206 and IEDs 202 are installed. A wide variety of other monitoring and/or control functions can be performed by IEDs 202 and the aspects and embodiments disclosed herein are not limited to IEDs 202 operating as described in the above-mentioned examples.

It is to be understood that IEDs 202 may take various forms and may each have an associated complexity (or set of functional capabilities and/or features). For example, one IED 202 is a "basic" IED while another IED 202 is an "intermediate" IED and yet another IED 202 is an "advanced" IED. In such embodiments, the intermediate IED may have more functionality (e.g., energy measurement features and/or capabilities) than the basic IED, and advanced IED may have more functionality and/or features than both the intermediate IED and the basic IED. For example, in embodiments IED 202 (e.g., an IED with basic capabilities and/or features) may be capable of monitoring instantaneous voltage, current energy, demand, power factor, averages values, maximum values, instantaneous power, and/or long-duration rms variations and/or IED 202 (e.g., an IED with advanced capabilities) may be capable of monitoring additional parameters such as voltage transients, voltage fluctuations, frequency slew rates, harmonic power flows, and discrete harmonic components, all at higher sample rates, etc. It is understood that this example is for illustrative purposes only, and likewise in some embodiments an IED with basic capabilities may be capable of monitoring one or more of the above energy measurement parameters that are indicated as being associated with an IED with advanced capabilities. It is also understood that in some embodiments the IEDs 202 each have independent functionality.

In an embodiment, IEDs 202 may be communicatively coupled to a central processing unit (CPU) (and associated memory) via a data communications network. In some embodiments, IEDs 202 may be directly communicatively coupled to the network. In other embodiments, IEDs 202 may be indirectly communicatively coupled to the network via, for example, an intermediate device such as a connected hub (or a gateway) providing IEDs 202 with access to the network and/or CPU.

FIG. 2 further illustrates system 200 having two step-down transformers 204 and multiple IEDs 202 monitoring a mix of single-phase and three-phase downstream loads 206. It is to be understood that the electrical system 200 of FIG. 2 is just one embodiment of many potential embodiments to teach the concepts described herein.

Commonly assigned U.S. Patent Application Publication No. 2023/0152833, the entire disclosure of which is incorporated herein by reference, discloses a cloud-connected electrical system in which aspects of the present disclosure may be used.

Figure 3:
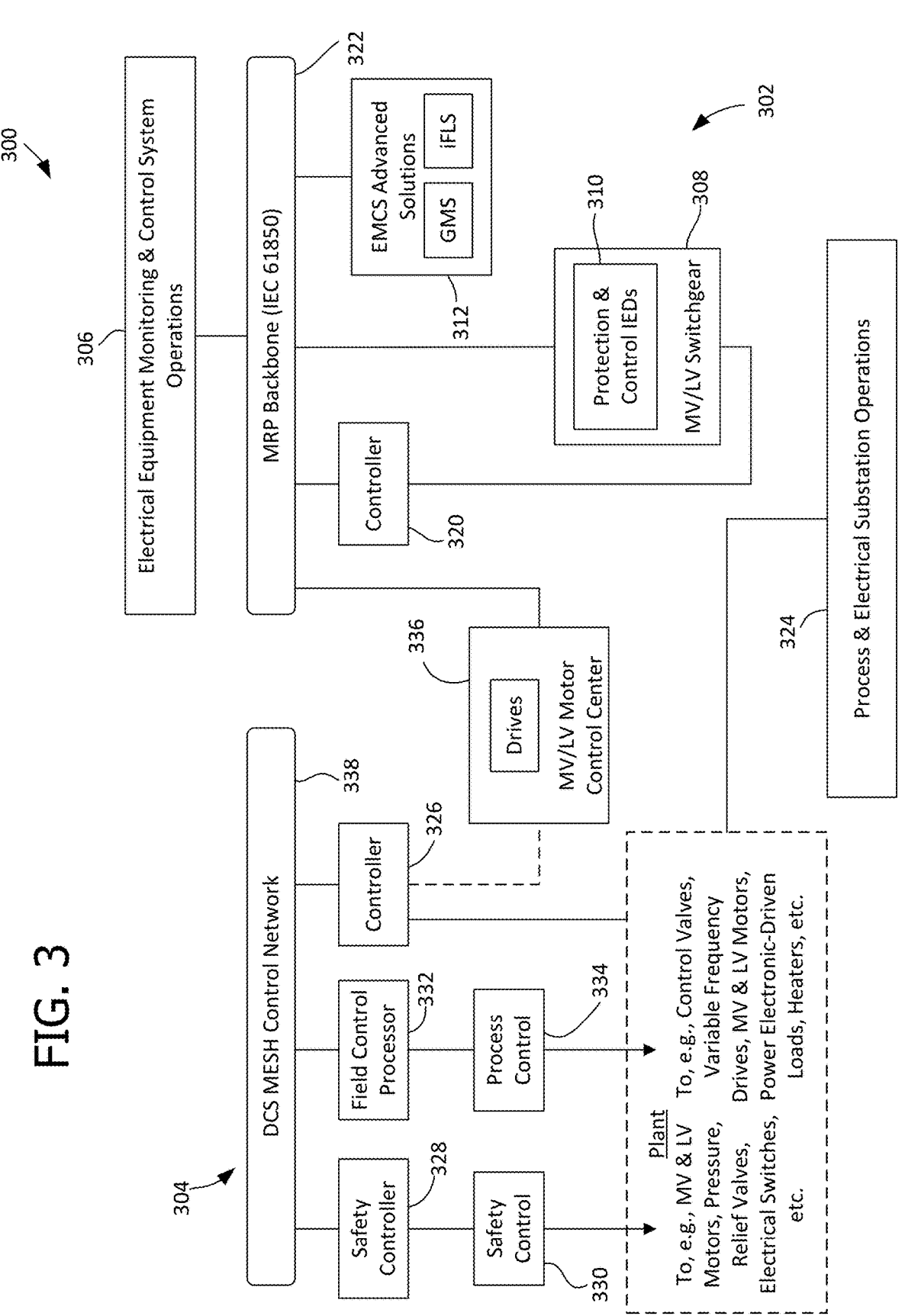
FIG. 3 illustrates an exemplary electrical and process system having a high availability unified architecture according to an embodiment.

Referring to FIG. 3, an example process and power system 300 is shown. In the illustrated embodiment, the system 300 integrates an electrical system, or domain, 302 and a process system, or domain, 304. The electrical system 302 is comprised of electrical equipment monitoring and control system (EMCS) operations indicated at 306. The EMCS operations 306 include, for instance, at least one human-machine interface (HMI) and at least one database containing archived EMCS data for automating electrical substation control, maintaining stable generating conditions, and the like. The electrical system 302 of FIG. 3 also includes medium voltage (MV) and/or low voltage (LV) switchgear 308 (housing protection and control IEDs 310 (e.g., IEDs 202 of FIG. 2)) and EMCS solutions 312 (including, for example, intelligent Fast Load Shed (iFLS) protection and a Generation Management System (GMS)). In an embodiment, at least one controller 320 (e.g., controller 104 of FIG. 1) functions as an electrical controller. The controller 320 provides functionality for data acquisition, display, history collection, storage, alarming, analysis, reporting, etc. for electrical system 302. The controller 320 is configured for obtaining data from the various MV and LV devices. As familiar to those skilled in the art, communications within electrical system 302 are in accordance with an IEC 61850 network, indicated at 322. IEC 61850 defines a standard for the design of electrical substation automation systems and applications, including a communication protocol. In this regard, each Intelligent Electronic Device, such as each IED 310, is a logical node on the IEC 61850 network 322 representing a functional capability of the device. Moreover, the controller 320 of electrical system 302 is a logical node on IEC 61850 network 322.

The process system 304 of FIG. 3 comprises process and electrical substation operations indicated at 324. The operations 324 include, for instance, at least one HMI, at least one database containing alarms and events, at least one historian, and the like. Moreover, process(es) and electrical substation operations 324 includes data analysis server 120, which analyzes time-series and frequency data from both the process system 304 and the electrical system 302. In an embodiment, at least one controller 326 functions as a process controller for the process system 304. The process system 304 also includes at least one safety controller 328 connected to one or more safety control devices 330 and at least one field control processor 332 connected to one or more process control devices 334. Further to the example of FIG. 3, the controller 326 also provides functionality for data acquisition, display, history collection, alarming, reporting, etc. with respect to a motor control center (MCC) 336 or the like for process system 304. As familiar to those skilled in the art, the components of process system 304 are coupled in accordance with a DCS MESH network, indicated at 338. In this embodiment, controller 326 of process system 304 is a node on MESH network 338 and maintains the high availability requirements of the DCS.

Figure 4:
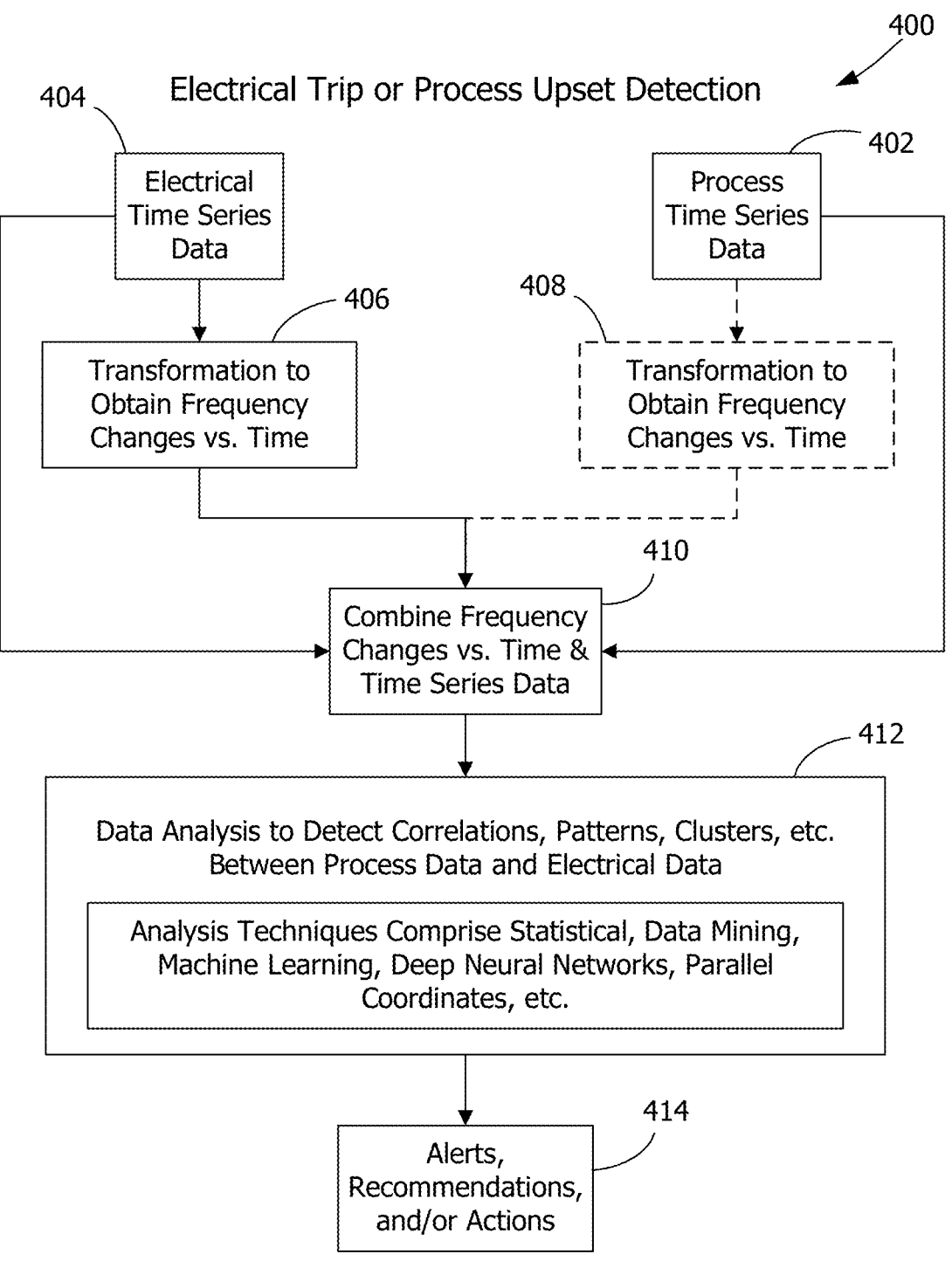
FIG. 4 illustrates an example process for simultaneously analyzing time-series and frequency data from both electrical and process systems.

FIG. 4 illustrates an example process 400 embodying aspects of the present disclosure for simultaneously analyzing time-series data from both the process domain 304 and the electrical domain 302 in the time-frequency domain to detect deviations from optimal, normal, or other predefined process conditions. In an embodiment, the analysis is performed on the electrical time-series data received from the electrical domain 302 to identify changes in frequency versus time of the electrical time-series data. In another embodiment, the analysis is performed on both the process time-series data received from the process domain 304 and the electrical time-series data received from the electrical domain 302 to identify changes in frequency versus time of the process time-series data and the electrical time-series data, respectively. Dominant frequency changes are occurrences of events or increases of parameters at one or more frequencies that are embedded in the relevant time-series data. Such deviations can be indicative of potential perturbations to the process(es) or electrical trips and knowledge of them can allow an operator to take corrective action to prevent an undesired incident from occurring (or mitigating their effects if they do). In one example implementation, statistical analyses, patterns, and/or rates of change are evaluated to identify a potential onset of a process perturbation or an electrical trip event.

Beginning at 402, data analysis server 120 receives time-series data from the process domain 304. The process domain data includes any parameters derived from process system 304 by sensors 106 (e.g., temperatures, pressures, flowrates, laboratory/on-line analyzers). Similarly, at 404, data analysis server 120 receives time-series data from the electrical domain 302. The electrical domain data includes any parameters derived from electrical system 302 by sensors 106 (e.g., voltages, currents, imbalances, waveform distortions, symmetrical components, energies and powers). In an embodiment, the process time-series data has a first resolution, or data rate or frequency of data, and the electrical time-series data has a second resolution, or data rate or frequency of data, different than that of the process time-series data. Often, electrical time-series data has a higher resolution than process time-series data. At 406, data analysis server 120 transforms the time-series data from the electrical domain to obtain dominant, or characteristic, frequency changes in the data over time. Optionally, the time-series data from the process domain undergoes a similar transformation at 408. Detecting when changes in frequencies occur in time-series data creates a time-series of the changes in dominant frequencies. In an embodiment, these changes in frequencies are combined at 410 with the time-series data from the process(es) and/or electrical domains so that they can be analyzed together (i.e., the changes in frequencies are co-analyzed with the time-series data from the process domain 304 and electrical domain 302).

As indicated in the example flow diagram of FIG. 4, the analysis performed at 412 by data analysis server 120 detects instances of deviation from predefined process conditions or electrical trips by detecting one or more of correlations, patterns, clusters, or other statistically-interesting variations in the rate of change indications. For example, changes in current in the electrical domain 302 may be correlated with temperature changes over time in the process domain 304 as reflected in the time-series data. Performing a wavelet analysis according to aspects of the present disclosure reveal when frequency changes occur for detecting correlations. It is to be understood that data analysis server 120 examines dominant frequency changes over time in the time-series data from the electrical domain 302 or in the time-series data from the process domain 304 or in both without deviating from the scope of the present disclosure. The data analysis server 120 employs one or more of statistical analyses, data mining, machine learning (ML), deep neural networks, parallel coordinate analyses, rules-based algorithms, etc. to identify deviations and predict or detect onset of an undesired event such as a process perturbation or electrical trip. Machine learning focuses on the use of statistics-based algorithms to formalize and/or extend the data properties/characteristics of "specific cases" to newly captured data to facilitate performing analysis tasks without explicit instructions. The specific cases mentioned here are used to "teach" or "train" the ML algorithm, building an ML model that is used to consider and analyze new cases, accordingly. Building an effective (i.e., enough relevant data to produce successful and/or statistically valid results in most cases) database or library of tagged (i.e., previously, ascertained, assessed, and/or validated) waveform capture data is generally required to create a successful ML model, and thus, a successful ML application.

The ML approach may be improved by incorporating a feedback loop into the process. As new cases are analyzed, the end-user (or by some other means) may continue "tagging" waveform capture data to enhance data quality. Over time, intentional and accurate assessments of sag and swell events by an external source (i.e., manually, some other algorithm, etc.) would continue updating and/or improving the ML algorithm/model as additional events are incorporated into the model.

In an embodiment, actions such as one or more alerts and/or recommendations are generated at 414 through analysis to prevent defer, or mitigate interruptions, i.e., process perturbations or electrical trips, from occurring. It is to be understood that in addition to lessening or reducing their impact, "mitigation" as used herein includes preventing process perturbations or electrical trips from occurring as well as deferring them. Such indications further allow an operator to take corrective action to prevent the undesired incident from occurring. In an alternative embodiment, the system takes an automated corrective action. In one example implementation, the dominant frequency changes of the process and electrical time-series data can be compared for similarities or correlations or undergo other analysis techniques. A high degree of correlation or similar measures, for example, indicates that the changes that are occurring in either the process domain or electrical domain can result in a perturbation condition or a trip event.

Referring further to FIG. 4, the electrical time-series data undergoes a frequency transformation at 406. In an embodiment, the frequency transformation comprises use of a wavelet transform. As is understood in the art, a major disadvantage of the Fourier transform is that it captures global frequency information, which makes it suitable for time-invariant signals, where frequencies persist over the entire signal. The wavelet transform, on the other hand, can extract local spectral and temporal information simultaneously by decomposing a time series using a set of wavelet functions with varying wavelengths and sliding them across the whole time series. In an embodiment, an interface connecting the respective process and electrical domains, such as disclosed in U.S. application Ser. No. 18/124,852, the entire disclosure of which is incorporated herein by reference, may be used to test that the wavelet transform works.

It is to be understood that other frequency transformations, including various forms of wavelet transformations, may be used within the scope of the invention. For example, a continuous wavelet transform (CWT), by which the wavelets are continuously sampled, is particularly useful for demonstrating the greatest rate of change in a time-series waveform as a bright area or color change in a frequency vs. time image. In another example, a discrete wavelet transform (DWT) is a wavelet transform for which the wavelets are discretely sampled. The DWT is used in conjunction with a series of low-pass filters and high-pass filters to split the original signal into a low-pass sub-band and a high-pass sub-band providing levels of detail for thresholding the signal. In addition, the DWT is particularly useful for de-noising a time-series waveform. In yet another example, the Short-time Fourier transform (STFT) can identify when dominant frequency changes occur in time-series data by dividing a signal into segments and performing a Fourier transform over each segment.

Aspects of the present disclosure include artificially introducing or "injecting" noise into the electrical and/or process domains and then extracting wavelets for comparison to normal. In this manner, imposing artificial changes onto the systems can reveal disturbances.

Setting proper alarm limits/thresholds and their optimization play a vital role in plant operations. Incorrect plant operating alarm limits are the root cause of the poor performance of industrial alarm systems and can eventually lead to plant incidents and accidents. Aspects of the present disclosure support operational decision-making for determining values for plant operating alarm limits designed to prevent, defer, or mitigate process perturbations and electrical trips. Aspects of the present disclosure include creating a digital twin of process 100 to analyze optimal operating regions of assets 114. In an embodiment, the digital twin is used to simulate two principal scenarios: 1) process anomalies or changes that could adversely impact the electrical network, and 2) anomalies or changes in the electrical network that will adversely impact the process operations. Building a simulation model(s) permits exploring and demonstrating the functionality in principle and later verifying and updating the model(s) based on actual operational data. Aspects of the present disclosure integrate dynamic simulation of the process with an Electrical Transient Analyzer Program (ETAP) to create a digital twin for analyzing the process and electrical dynamics, transients, and protection.

In an embodiment, data analysis server 120 executes algorithms for performing one or more of statistical analyses, data mining, machine learning, deep neural networks, parallel coordinate analyses, rules-based algorithms, etc. on multivariate time-series data generated by the electrical and process domains 302, 304 to detect anomalies. In contrast, traditional Fourier transform anomaly detection approach works on time-invariant data and conventional machine learning and deep learning-based anomaly detection also mainly works on time-invariant data.

Conventional attempts to employ deep learning on multivariate data has been limited for use on the same type of sensors (e.g., all process sensors from equipment such as pumps/chillers, etc. or all vibration sensors used on rotating equipment). Known approaches cannot combine electrical system signals with other types of signals from process equipment together to identify a system anomaly and root cause. This is due to different sensors having dramatically different sampling frequency rates or resolutions while conventional deep learning approaches require different sensors to have the same time interval while univariable approaches such as FFT do not study the correlations between variables.

Advantageously, parallel coordinates geometry may be used to identify an optimal operating zone. Parallel coordinates provide a means of visualizing geometric objects in many dimensions and are particularly useful for displaying multivariate data and supporting multivariate analysis. Aspects of the present disclosure include using parallel coordinates geometry to transform orthogonal axes to parallel axes. The input data to the parallel coordinate geometry is real time data (i.e., from a runtime database of historian 118) and changes in dominant frequencies over time related to the process and electrical data. The data analysis server 120 plots the anomalies in parallel coordinate geometry. As described above, data analysis server 120 provides recommendations for maintaining the operational boundaries of assets 114 of industrial process control system 100 based on the deviations.

Figure 5:
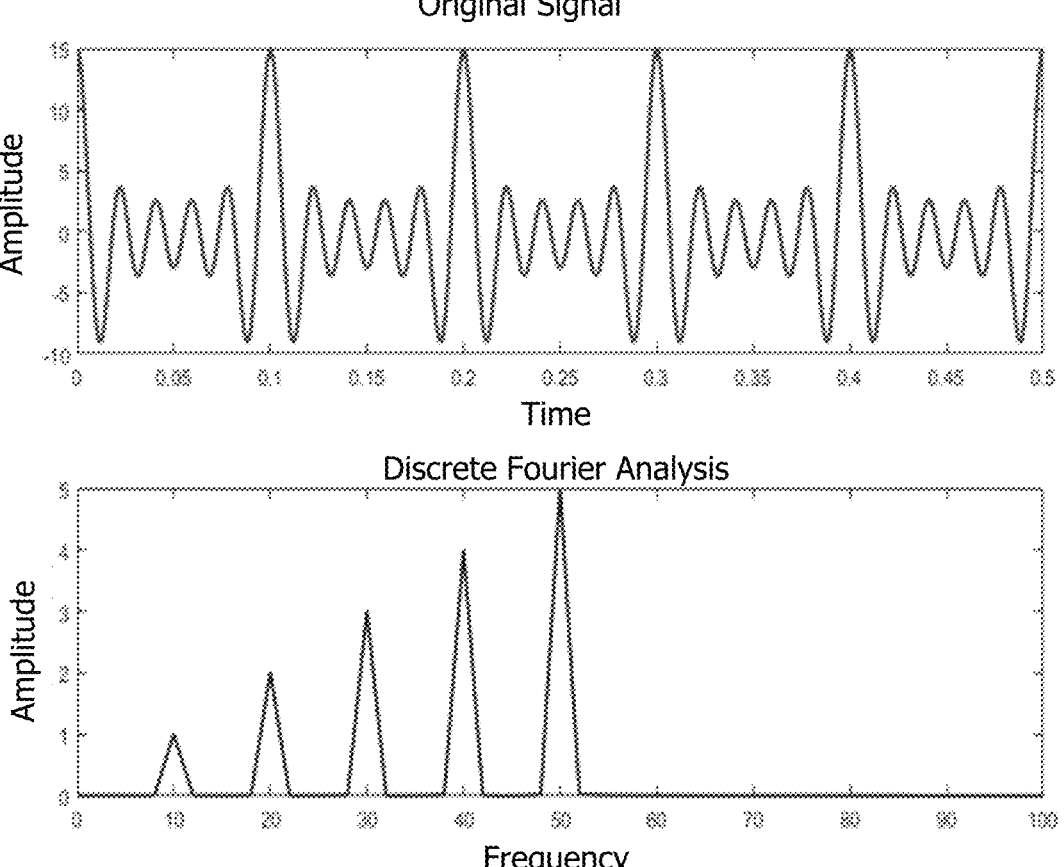
Figure 6:
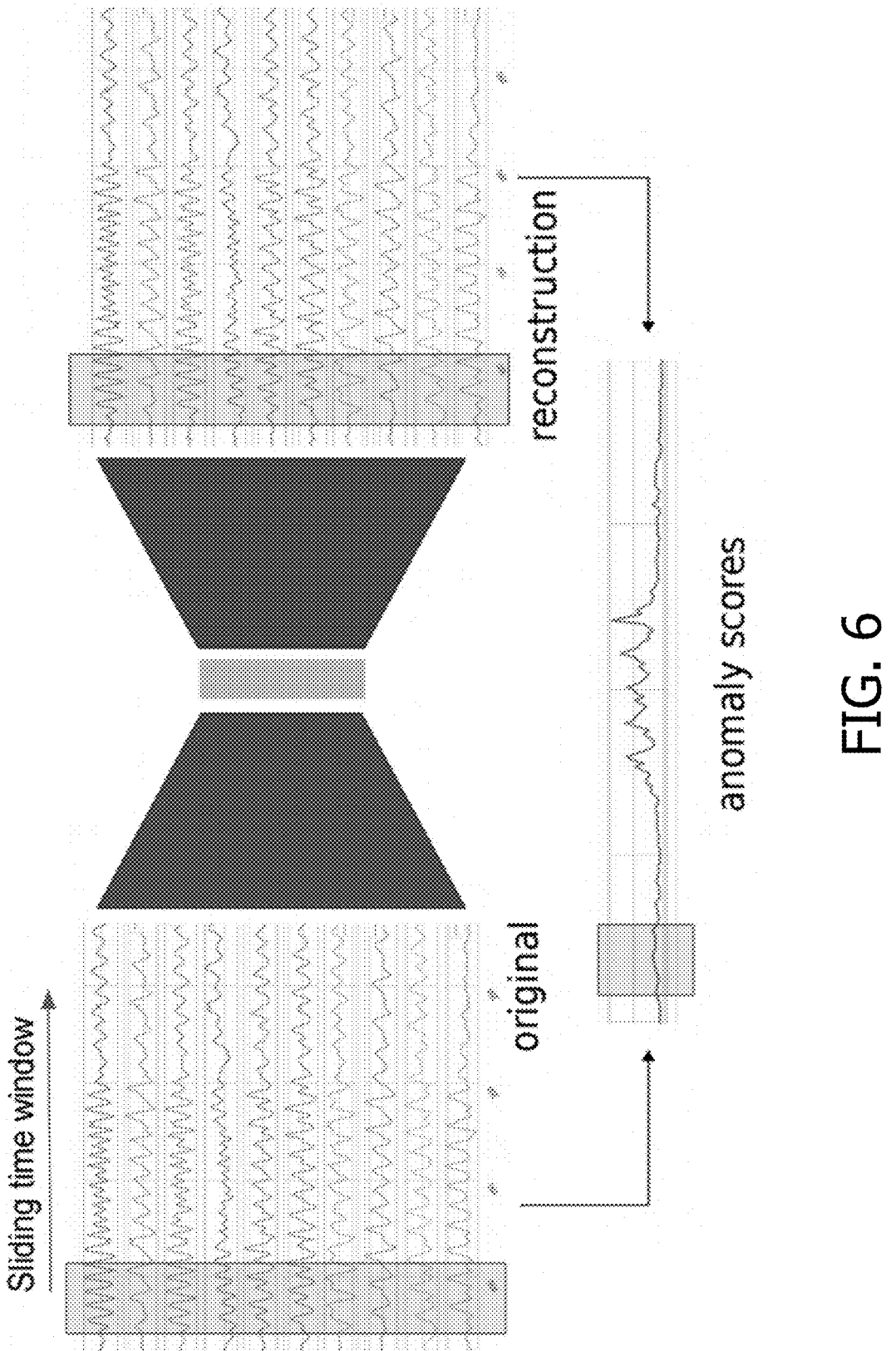

Referring to FIGS. 5 to 8, the parallel coordinates approach is used to identify system anomalies and root cause(s) by combining electric sensor data, vibration sensor data, process sensor data, and other types of sensor data. Using the parallel coordinates approach eliminates the need to prove a threshold to the anomaly score calculated by the machine learning model. Moreover, using the parallel coordinates approach eliminates the need to identify which dominant frequency is abnormal from typical time/frequency domain analysis. A time/frequency domain approach, or a deep learning/machine learning approach, is first applied to high frequency data (i.e., electrical data such as voltage or current) to get an anomaly score. The anomaly score is a time-series data having the same frequency as the slow frequency sensor data (i.e., process data such as pressure). In FIG. 5, an example waveform of 30 seconds duration is shown accompanied by a discrete Fourier analysis of the waveform. According to this example, every half minute frequency information is output. FIG. 6 further illustrates the sliding time window.

The table of FIG. 7 shows the example frequency data at Frequency_1 and Frequency_2 and shows the example anomaly score at Anomaly Score for the sliding time window.

Electric sensors provide high frequency data and process sensors provide low frequency data. For example, process data such as pressure and temperature comprise minute level data resolution. The high frequency data and the low frequency data are combined to identify a relationship by first applying a frequency transformation (e.g., wavelet transform). Aspects of the present disclosure include extracting features from the higher resolution data and converting the extracted features to the same data frequency as the lower resolution data. The converted features of the electric data are then combined with the process data. In an embodiment, a deep learning analysis performed on the combined data in the cloud reveals anomalies indicative of a potential perturbation or electric trip.

Applying the parallel coordinates approach yields a dynamic envelope that reflects an optimal operation range, helping maintain the plant at optimal conditions. If any of the process time-series data or electrical time-series data or the transformed data from either the process or electrical domains (or both) touch the dynamic operation envelope, an "anomaly" warning is generated. By following the sequence of the "anomaly" caused by touching the operation envelope, the root cause of the system anomaly is more easily traced and determined.

Figure 8:
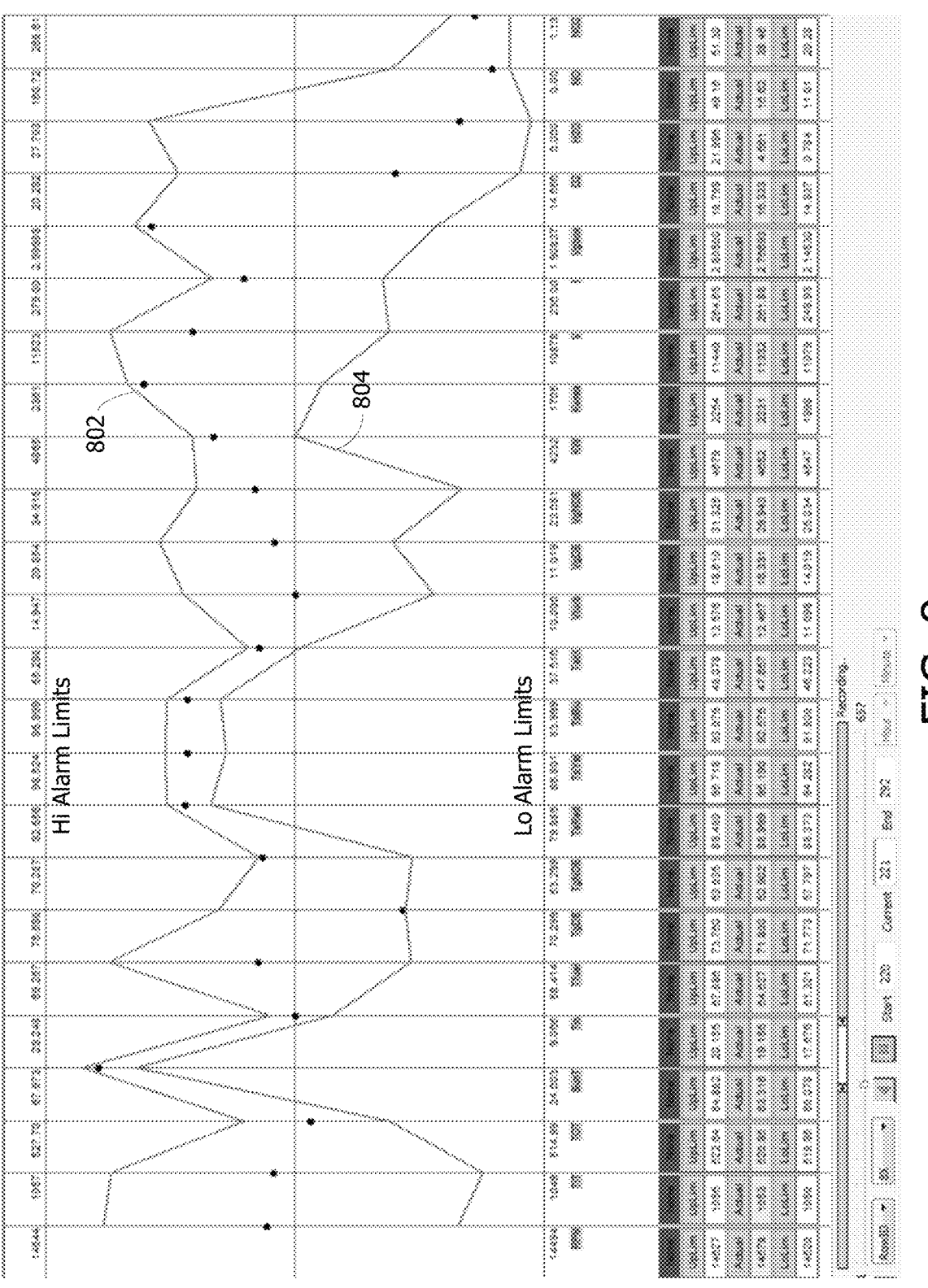

A partial screen shot of an example plot of the upper and lower limit data using parallel coordinates is shown in FIG. 8. In an embodiment, a high alert limit is indicated at 802 and a low alert limit is indicated at 804.

According to aspects of the present disclosure, the process variables are plotted against the alarm limits in parallel coordination geometry using, for example, a visualization tool such as PI Vision available from AVEVA Group plc, a member of the Schneider Electric group. Parallel coordination provides the deviations of alarm limit boundaries outside the alarm limits configured. Advantageously, parallel coordinates geometry provides means for visualizing geometric objects in many dimensions and are particularly useful for displaying multivariate data and supporting multivariate analysis.

In an embodiment, extending the evaluation to include the rate of change of a variable or variables indicates instability issues within the system. Comparing one or more variables' historical/typical rates of change to real-time changes in said variable(s) indicates a higher uncertainty/unpredictability in the process that could lead to a problem. Automatic or manual "rate of change" thresholds can be used to trigger alarms.

In an embodiment, a method for preventing a process perturbation and/or an electrical trip event in an industrial plant comprises receiving time-series data from a process domain of the industrial plant (e.g., temperatures, pressures, flow rates, laboratory, on-line analyzers) and time-series data from an electrical domain of the industrial plant (e.g., voltages, currents, imbalances, waveform distortions, harmonics frequencies, interharmonic frequencies, sub-harmonic frequencies, symmetrical components, energies and powers, etc.). The method also includes performing a wavelet transformation on the time-series data from the process domain, and on the time-series data from the electrical domain, to identify dominant frequency changes over time in the time-series data from the process domain and the time-series data from the electrical domain. By simultaneously analyzing the identified dominant frequency changes over time in the time-series data and the time-series data from the process domain and in the time-series data from the electrical domain, the method detects instances of deviation from predefined process conditions or electrical trips indicating the onset of at least one of a process perturbation and an electrical trip event. The method further comprises generating at least one action configured to prevent, defer, or mitigate the process perturbation and/or the electrical trip event from occurring in response to detecting instances of deviation from the predefined process conditions or electrical trips indicating the onset of at least one of a process perturbation and an electrical trip event.

Aspects of the present disclosure optionally use one or more digital or analog I/O signals to more optimally function. For example, one or more embodiments optionally use a digital status input signal from at least one single-phase or three-phase load (e.g., a polyphase induction motor) to simplify processing and/or enhancing its analysis(es), assessment(s), result(s) and/or recommendation(s). Alternatively, one or more embodiments may use an analog I/O signal from a load(s) (e.g., a polyphase induction motor) to incorporate measured temperatures (i.e., from thermocouple(s)) into its analysis(es), assessment(s), result(s), and/or recommendation(s). I/O signals may be produced or used by at least one of the IEDs, gateways, software systems, cloud-based systems or other applications as necessary. I/O data may be used to indicate a load(s) energizing or de-energizing that may create a disturbance event. If the location of these load(s) are known and the disturbance event directly correlates with their energizing or de-energizing, this information may be used to help determine whether the disturbance event's source or origin is upstream or downstream of one or more IEDs.

It is to be understood that an input is data that a processor, DCS, PLC, and/or IED receives, and an output is data that a processor and/or IED sends. Inputs and outputs may either be digital or analog. The digital and analog signals may be both discrete variables (e.g., two states such as high/low, one/zero, on/off, etc. If digital, this may be a value. If analog, the presence of a voltage/current may be considered by the system/IED as an equivalent signal) or continuous variables (e.g., continuously variable such as spatial position, temperature, pressure voltage, etc.). They may be digital signals (e.g., measurements in an IED coming from a sensor producing digital information/values) and/or analog signals (e.g., measurements in an IED coming from a sensor producing analog information/values). These digital and/or analog signals may include any processing step within the IED (e.g., derive an active power (kW), power factor, a magnitude, a relative phase angle, among all the derived calculations).

Processors, DCSs, PLCs, and/or IEDs may convert/reconvert digital and analog input signals to a digital representation for internal processing. Processors and/or IEDs may also be used to convert/reconvert internally processed digital signals to digital and/or analog output signals to provide some indication, action, or other response (such as an input for another processor/IED). Typical uses of digital outputs may include signaling relays to open or close breakers or switches, signaling relays to start or stop motors and/or other equipment, and operating other devices and equipment that are able to directly interface with digital signals. Digital inputs are often used to determine the operational status/position of equipment (e.g., is a breaker open or closed, etc.) or read an input synchronous signal from a utility pulsed output. Analog outputs may be used to provide variable control of valves, motors, heaters, or other loads/processes in energy management systems. Finally, analog inputs may be used to gather variable operational data and/or in proportional control schemes.

A few more examples where digital and analog I/O data are leveraged may include (but not be limited to): turbine controls, plating equipment, fermenting equipment, chemical processing equipment, telecommunications, equipment, precision scaling equipment, elevators and moving sidewalks, compression equipment, waste water treatment equipment, sorting and handling equipment, plating equipment temperature/pressure data logging, electrical generation/transmission/distribution, robotics, alarm monitoring and control equipment, as a few examples.

The above-discussed method (and/or other systems and/or methods discussed herein) may include one or more of the following features either individually or in combination with other features in some embodiments. For example, in some embodiments the energy-related signals captured by the at least one IED may include at least one of: a voltage signal, a current signal, an input/output (I/O) data, and a derived energy-related value. In some embodiments, the I/O data includes at least one of on/off status(es), open/closed status(es), high/low status(es), temperature(s), pressure(s), and volume(s). Additionally, in some embodiments the derived energy-related value includes at least one of: a calculated, computed, estimated, derived, developed, interpolated, extrapolated, evaluated, and otherwise determined additional energy-related value from the at least one of the voltage signal and/or the current signal. In some embodiments, the derived energy-related value includes at least one of: active power, apparent power, reactive power, energy, harmonic distortion, power factor, magnitude/direction of harmonic power(s), harmonic voltage(s), harmonic current(s), interharmonic current(s), interharmonic voltage(s), magnitude/direction of interharmonic power(s), magnitude/direction of sub-harmonic power(s), individual phase currents, phase angle(s), impedance(s), sequence component(s), total voltage harmonic distortion, total current harmonic distortion, three-phase current(s), phase voltage(s), line voltage(s) and/or other similar/related parameters. In some embodiments, the derived energy-related value includes at least one energy-related characteristic, the energy-related characteristic including magnitude, direction, phase angle, percentage, ratio, level, duration, associated frequency components, impedance, energy-related parameter shape, and/or decay rate. It is understood that the energy-related signals may include (or leverage) substantially any electrical parameter derived from at least one of the voltage and current signals (including the voltages and currents themselves), including, for example, load levels and patterns, as will be understood from further discussions below.

In some embodiments, the above-discussed method (and/or other system(s) and/or method(s) discussed herein) may be implemented on the at least one IED called for in the above-discussed method (and/or other systems and/or methods discussed herein). Additionally, in some embodiments the above-discussed method (and/or other systems and/or methods discussed herein) may be implemented partially or fully remote from the at least one IED, for example, in a gateway, on-site software, edge software, a remote server, etc. (which may collectively or alternatively be referred to herein as a "head-end" system). It is to be understood that "cloud-based software," "edge software," "edge system," "management system," "software management system," etc. may collectively or alternatively be referred to herein as "head-end software" generally (for the purposes of this application). In some embodiments, the at least one IED may be coupled to measure energy-related signals, receive electrical measurement data from or derived from the energy-related signals at an input, and configured to generate at least one or more outputs. The outputs may be used to identify the at least one potential load type associated with the characterized and/or quantified at least one identified variation/change in the electrical system. Examples of the at least one IED may include a smart utility meter, a power quality meter, and/or another measurement device (or devices). The at least one IED may include breakers, relays, power quality correction devices, uninterruptible power supplies (UPSs), filters, and/or variable speed drives (VSDs), for example. Additionally, the at least one IED may include at least one virtual (e.g., residual energy-related signal measurement, calculation, or derivation) meter in some embodiments.

In some embodiments, the energy-related signals may be continuously or semi-continuously captured and/or logged by the at least one IED, and variation(s)/change(s) identified in the energy-related signals may be updated (e.g., evaluated/re-evaluated, prioritized/re-prioritized, tracked, etc.) in response thereto. For example, variation(s)/change(s) may initially be identified from energy-related signals captured at a first time, and may be updated or revised in response to (e.g., to include or incorporate) variation(s)/change(s) identified from energy-related signals captured at a second time. As variation(s)/change(s) are identified, the variation(s)/change(s) may be characterized and/or quantified, information related to the characterized and/or quantified identified variation(s)/change(s) may be appended to time-series information associated with energy-related data, and characteristics and/or quantities associated with the time-series information may be evaluated to identify at least one potential load type associated with the characterized and/or quantified identified variation(s)/change(s), for example. The appended information may include, for example, tagged indications on the time-series information, metadata, characteristics and/or other information related to the characterized and/or quantified identified variation(s)/change(s).

As used herein, the terms "upline" and "downline" (also sometimes referred to as "upstream" and "downstream", respectively) are used to refer to electrical locations within an electrical system. More particularly, the electrical locations "upline" and "downline" are relative to an electrical location of an IED collecting data and providing this information. For example, in an electrical system including a plurality of IEDs, one or more IEDs may be positioned (or installed) at an electrical location that is upline relative to one or more other IEDs in the electrical system, and the one or more IEDs may be positioned (or installed) at an electrical location that is downline relative to one or more further IEDs in the electrical system. A first IED or load that is positioned on an electrical circuit upline from a second IED or load may, for example, be positioned electrically closer to an input or source of the electrical system (e.g., an electrical generator or a utility feed) than the second IED or load. Conversely, a first IED or load that is positioned on an electrical circuit downline from a second IED or load may be positioned electrically closer to an end or terminus of the electrical system than the other IED (so in this case, it will be closer to a load or group of loads).

A first IED or load that is electrically connected in parallel (e.g., on an electrical circuit) with a second IED or load may be considered to be "electrically" upline from said second IED or load in embodiments, and vice versa. In embodiments, algorithm(s) used for determining a direction of a power quality event (i.e., upline or downline) is/are located (or stored) in the IED, cloud, on-site software, gateway, etc. As one example, the IED can record an electrical event's voltage and current phase information (e.g., by sampling the respective signals) and communicatively transmit this information to a cloud-based system. The cloud-based system may then analyze the voltage and current phase information (e.g., instantaneous, root-mean-square (rms), waveforms and/or other electrical characteristic) to determine if the source/origin of an energy-related transient (or other energy-related event) is electrically upline or downline from where the IED is electrically coupled to the electrical system (or network).

In some embodiments, the energy-related data from or derived from the energy-related signals captured by the at least one IED is processed on at least one of: the IED, the cloud-based system, the on-site or edge software, the gateway, and the other head-end system associated with the electrical system. In these embodiments, for example, the at least one IED may be communicatively coupled to the at least one of: the cloud-based system, the on-site or edge software, the gateway, and any other head-end system on which the electrical measurement data is processed, analyzed, and/or displayed.

In some embodiments, data associated with the energy-related data or signals is stored (e.g., in a memory device of at least one device or system associated with the electrical system) and/or tracked over a predetermined time period. The predetermined time period may be a user-configured time period, for example. In some embodiments, the stored and/or tracked data includes information associated with identifying the at least one potential load type. The information associated with identifying the at least one potential load type may include, for example, at least one of: the at least one identified variation/change, the characterized and/or quantified at least one identified variation/change, the time-series information, and the evaluated characteristics and/or quantities associated with the time-series information. In some embodiments, the information associated with identifying the at least one potential load type may be saved and/or tracked for future analyses/uses. For example, the stored and/or tracked information may be used to generate a library of load types and associated start/run/change/stop characteristics and/or be added to a pre-existing library of load types and associated start/run/change/stop characteristics. In embodiments in which there is a pre-existing library of load types and associated start/run/change/stop characteristics, the at least one potential load type identified using the systems and methods described herein may be selected from a plurality of potential loads types in the pre-existing library of load types and associated start/run/change/stop characteristics.

In some embodiments, the above-described system may correspond to a control system (e.g., the previously discussed control system) used for monitoring or controlling one or more parameters associated with the electrical system. As previously discussed, in some embodiments, the control system may be a meter, an IED (e.g., of the at least one IED responsible for capturing the energy-related signals), programmable logic controller (PLC), head-end software (e.g., edge software system), a cloud-based control system, a gateway, a system in which data is routed over the Ethernet or some other communications system, etc.

It is understood that the systems and methods described herein may be responsive to changes in the electrical system(s) in which the systems and methods are provided and/or implemented. For example, the prescribed threshold or thresholds that the at least one identified variation/change is compared to determine if the at least one identified variation/change meets the prescribed threshold or thresholds, may be a dynamic threshold or thresholds that change in response to changes in the electrical system(s). The changes in the electrical system(s) may be detected, for example, from the energy-related signals captured by the at least one IED in the electrical system(s). In one example implementation, the changes are detected after manually training/teaching a system to identify the changes. For example, the specific equipment (or processes) operating at a given time may be described to allow the system to learn (i.e., a form of machine learning). In another example implementation, the changes are detected by automatically identifying operational modes using state of the art machine learning algorithms (e.g., using time series clustering or using spectral or any other algorithms helpful in analysis to identify patterns).

As will become further appreciated from discussions below, the disclosed invention provides, among other features, the ability to characterize voltage, current, and other derived signals to better understand upstream and downstream loads, their operation(s) and impact(s) to the electrical system. The ability to automatically evaluate energy-related data to associate, characterize, quantify, identify, and analyze helps end-users to better understand the operation of their electrical system. It may also provide many more services and solutions opportunities to energy-related companies, such as Schneider Electric, the assignee of the present disclosure.

It is understood that the at least one energy-related waveform capture described in connection with the above method (and the other methods and systems discussed below) may be associated with energy-related signals captured or measured by the at least one IED. For example, in accordance with some embodiments of this disclosure, the at least one energy-related waveform capture may be generated from at least one energy-related signal captured or measured by the at least one IED. According to IEEE Standard 1057-2017, for example, a waveform is "[a] manifestation or representation (e.g., graph, plot, oscilloscope presentation, discrete time series, equations, table of coordinates, or statistical data) or a visualization of a signal." With this definition in mind, the at least one energy-related waveform may correspond to a manifestation or representation or a visualization of the at least one energy-related signal. It is understood that the above relationship is based on one standards body's (IEEE in this case) definition of a waveform, and other relationships between a waveform and a signal are of course possible, as will be understood by one of ordinary skill in the art.

It is understood that the energy-related signals or waveforms captured or measured by the at least one IED may include (or leverage) substantially any electrical parameter derived from at least one of the voltage and current signals (including the voltages and currents themselves), for example. It is also understood that the energy-related signals or waveforms may be continuously or semi-continuously/periodically captured/recorded and/or transmitted and/or logged by the at least one IED. As noted above, the at least one captured energy-related waveform may be analyzed (e.g., in real-time, pseudo-real time, or historically) to determine if the at least one captured energy-related waveform is capable of being compressed, while maintaining relevant attributes for characterization, analysis and/or other use.

In some embodiments, the at least one IED capturing the energy-related waveforms includes at least one metering device. The at least one metering device may correspond, for example, to at least one metering device in the electrical system for which the energy-related waveforms are being captured/monitored.

It is understood that the terms "processor" and "controller" are sometimes used interchangeably herein. For example, a processor may be used to describe a controller. Additionally, a controller may be used to describe a processor.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A system for detecting interruptions in operations of a facility, the facility having a process domain and an electrical domain, the system comprising:

one or more process domain sensors associated with the process domain of the facility, the process domain sensors configured to acquire samples at a first frequency for providing first time-series data, the first-time series data comprising one or more operating characteristics from the process domain sampled at the first frequency, the first time-series data having a first resolution;

one or more electrical domain sensors associated with the electrical domain of the facility, the electrical domain sensors configured to acquire samples at a second frequency different than the first frequency for providing second time-series data, the second time-series data comprising one or more electrical parameters from the electrical domain sampled at the second frequency, the second time-series data having a second resolution different than the first resolution;

a data analysis processor receiving and responsive to the first and second time-series data;

a memory coupled to the data analysis processor, the memory storing processor-executable instructions that, when executed, configure the data analysis processor for:

performing a wavelet transformation on the first and second time-series data to extract features therefrom indicating when frequency changes occur in the first and second time-series data;

converting the extracted features of at least one of the first time-series data or the second time-series data to form a combined data set having a common resolution;

identifying, from the combined data set, one or more dominant frequency changes over time in at least one of the first time-series data from the process domain or the second time-series data from the electrical domain or both;

detecting one or more instances of deviation from predefined conditions in the process domain or the electrical domain or both based on the identified one or more dominant frequency changes over time and the first and second time-series data, each of the detected one or more instances of deviation indicating an onset of a facility interruption; and in response to detecting the one or more instances of deviation from the predefined conditions indicating the onset of the facility interruption, performing at least one automated action configured to mitigate the facility interruption.

2. The system of claim 1, wherein the facility interruption comprises at least one of a process perturbation in the process domain or an electrical trip event in the electrical domain.

3. The system of claim 1, wherein identifying, from the combined data set, one or more dominant frequency changes comprises analyzing at least one of: patterns, correlations, clusters, or rate of change indications therein.

4. The system of claim 1, wherein the at least one action configured to mitigate the facility interruption comprises at least one of: generating an alert or providing a recommendation to prevent the facility interruption from occurring.

5. The system of claim 1, wherein the memory stores processor-executable instructions that, when executed, further configure the data analysis processor for generating at least one corrective action configured to be taken by an operator to prevent the facility interruption from occurring.

6. The system of claim 1, wherein the memory stores processor-executable instructions that, when executed, further configure the data analysis processor for:

simulating operation of the facility with a digital twin thereof; and producing, by the digital twin, simulated output parameters based on the detected one or more instances of deviation.

7. The system of claim 6, wherein the simulated output parameters produced by the digital twin correspond to output parameters associated with the facility.

8. The system of claim 7, wherein the memory stores processor-executable instructions that, when executed, further configure the data analysis processor for:

plotting the output parameters associated with the facility and the simulated output parameters on at least one parallel coordinates plot; and identifying, from the parallel coordinates plot, an operating range for which the simulated output parameters are within an optimum range of values.

9. The system of claim 1, wherein converting the extracted features of at least one of the first time-series data or the second time-series data comprises synchronizing the first time-series data from the process domain and the second time-series data from the electrical domain with each other.

10. The system of claim 1, wherein the memory stores processor-executable instructions that, when executed, further configure the data analysis processor for combining the converted extracted features of the second time-series data from the electrical domain with the first time-series data from the process domain to form the combined data set.

11. The system of claim 10, wherein detecting the one or more instances of deviation from predefined conditions comprises executing machine learning on the combined data set.

12. The system of claim 1, further comprising a controller configured to generate a command for adjusting an operating parameter of one or more of a pump, a motor, a valve, an actuator, an electrostatic precipitator, an electrolyzer, a vibrator, or a heater.

13. The system of claim 1, wherein noise is injected into at least one of the electrical domain or the process domain before performing the wavelet transformation.

14. A method for detecting interruptions in operations of a facility, the facility having a process domain and an electrical domain, the system comprising:

acquiring, by one or more process domain sensors associated with the process domain of the facility, samples at a first frequency for providing first time-series data, wherein the first-time series data comprises one or more operating characteristics from the process domain sampled at the first frequency, and wherein the first time-series data has a first resolution;

acquiring, by one or more electrical domain sensors associated with the electrical domain of the facility, samples at a second frequency different than the first frequency for providing second time-series data, wherein the second time-series data comprises one or more electrical parameters from the electrical domain sampled at the second frequency, and wherein the second time-series data having a second resolution different than the first resolution;

executing, by a data analysis processor receiving and responsive to the first and second time-series data, processor-executable instructions stored in a memory coupled to the data analysis processor, wherein the instructions, when executed, configure the data analysis processor for:

performing a wavelet transformation on the first and second time-series data to extract features therefrom indicating when frequency changes occur in the first and second time-series data;

converting the extracted features of at least one of the first time-series data or the second time-series data to form a combined data set having a common resolution;

identifying, from the combined data set, one or more dominant frequency changes over time in at least one of the first time-series data from the process domain or the second time-series data from the electrical domain or both;

detecting one or more instances of deviation from predefined conditions in the process domain or the electrical domain or both based on the identified one or more dominant frequency changes over time and the first and second time-series data, each of the detected one or more instances of deviation indicating an onset of a facility interruption; and in response to detecting the one or more instances of deviation from the predefined conditions indicating the onset of the facility interruption, performing at least one automated action configured to mitigate the facility interruption.

15. The method of claim 14, wherein the facility interruption comprises at least one of a process perturbation in the process domain or an electrical event in the electrical domain.

16. The method of claim 14, wherein identifying, from the combined data set, one or more dominant frequency changes comprises analyzing at least one of: patterns, correlations, clusters, or rate of change indications therein.

17. The method of claim 14, wherein the at least one action configured to mitigate the facility interruption comprises at least one of: generating an alert or providing a recommendation to prevent the facility interruption from occurring.

18. The method of claim 14, further comprising wherein the memory stores processor-executable instructions that, when executed, further configure the data analysis processor for generating at least one corrective action configured to be taken by an operator to prevent the facility interruption from occurring.

19. The method of claim 14, wherein the memory stores processor-executable instructions that, when executed, further configure the data analysis processor for:

simulating operation of the facility with a digital twin thereof; and producing, by the digital twin, simulated output parameters based on the detected one or more instances of deviation.

20. The method of claim 19, wherein the simulated output parameters produced by the digital twin correspond to output parameters associated with the facility.

21. The method of claim 20, wherein the memory stores processor-executable instructions that, when executed, further configure the data analysis processor for:

plotting the output parameters associated with the facility and the simulated output parameters on at least one parallel coordinates plot; and identifying, from the parallel coordinates plot, an operating range for which the simulated output parameters are within an optimum range of values.

22. The method of claim 14, wherein converting the extracted features of at least one of the first time-series data or the second time-series data comprises synchronizing the first time-series data from the process domain and the second time-series data from the electrical domain with each other.

23. The method of claim 14, wherein the memory stores processor-executable instructions that, when executed, further configure the data analysis processor for combining the converted extracted features of the second time-series data from the electrical domain with the first time-series data from the process domain to form the combined data set.

24. The method of claim 23, wherein detecting the one or more instances of deviation from predefined conditions comprises executing machine learning on the combined data set.

25. The method of claim 14, further comprising generating, by a controller, a command for adjusting an operating parameter of one or more of a pump, a motor, a valve, an actuator, an electrostatic precipitator, an electrolyzer, a vibrator, or a heater.

26. The method of claim 14, further comprising injecting noise into at least one of the electrical domain or the process domain before performing the wavelet transformation.

* * * * *